United States Patent [19]

Sasaki

[11] Patent Number: 5,052,473
[45] Date of Patent: Oct. 1, 1991

[54] REGENERATIVE GAS TURBINE WITH HEAT EXCHANGER

[75] Inventor: Masafumi Sasaki, Yokohama, Japan

[73] Assignee: Nissan Motor Co., Ltd., Yokohama, Japan

[21] Appl. No.: 608,930

[22] Filed: Nov. 5, 1990

[30] Foreign Application Priority Data

Nov. 6, 1989 [JP] Japan ............................. 1-288267

[51] Int. Cl.⁵ ............................................. F28D 19/04
[52] U.S. Cl. ..................................... 165/9; 60/39.512; 165/8
[58] Field of Search .................... 165/9, 8; 60/39.512

[56] References Cited

U.S. PATENT DOCUMENTS

| | | |
|---|---|---|
| 2,579,212 | 12/1951 | Stevens et al. ............................. 165/9 |
| 3,372,735 | 3/1968 | Meijer ........................................ 165/9 |
| 3,884,087 | 5/1975 | Sakaki . | |
| 4,084,634 | 4/1978 | Handa . | |

FOREIGN PATENT DOCUMENTS

| | | |
|---|---|---|
| 60-6986 | 1/1985 | Japan . |
| 61-18384 | 2/1986 | Japan . |
| 1443659 | 7/1976 | United Kingdom ................... 165/9 |

Primary Examiner—Albert W. Davis, Jr.
Attorney, Agent, or Firm—Lowe, Price, Leblanc & Becker

[57] ABSTRACT

A heat exchanger for a gas turbine employs a duct housing assembly including an air duct housing and a gas duct housing. The air and gas duct housings have semicircular platforms, respectively. They are assembled in a spaced relationship with their platforms coplanar with each other, so that a gas leakage between the platforms and the adjacent axial end face of a heat exchange core disc is effectively prevented.

11 Claims, 5 Drawing Sheets

REGENERATIVE GAS TURBINE WITH HEAT EXCHANGER

BACKGROUND OF THE INVENTION

The present invention relates to a regenerative gas turbine with a heat exchanger.

As shown in JP-U 60-6986 and JP-U 61-18384, a regenerative gas turbine engine has a heat exchanger including a rotary heat exchange core disc wherein thermal energy from a high temperature exhaust gas from a turbine is used to heat a compressed discharge air from a compressor. In the heat exchanger, it is necessary to separate in a seal tight manner a flow of high temperature exhaust gas admitted to a portion of the heat exchange core disc from a flow of compressed air having passed through another portion of the heat exchange core disc. It has been the common practice to seal, between an axial face of the heat exchange core disc and a substantially planar platform of a duct housing. If this seal is broken owing to thermal deformation of the platform, a gas leakage takes place, resulting in a drop in heat exchange effeciency.

A two-shaft regenerative gas turbine called "AGT 100" is known according to a published leaflet "DDA/GM NASA Contract No. DEN3-168, 1981." In this gas turbine, a good gas sealing performance is exibited owing to a platform with an integral high temperature exhaust gas duct housing. This platform-duct integral structure is made of a material with a low thermal expansion, i.e., Litium Aluminium Silicate, and has a straight cross bar portion separating the exhaust gas from the compressed air having past through the core disc. After a prolonged use, this cross bar portion becomes excessively high in temperature as compared to its peripheral portion that is relatively low in temperature. Thus, even if the low thermal expansion material is used, there is possibility that the surface of the platform becomes rough and degraded, and at the fatal case the surface is damaged owing to thermal stress. Besides, the platform-duct integral structure is not easy to handle in assembly owing to its bulky size, causing a poor yield in manufacture.

An object of the present invention is to improve a heat exchanger for a gas turbine such that a good sealing performance is maintained between a platform and a heat exchange core disc without using the bulky integral structure mentioned above.

SUMMARY OF THE INVENTION

According to the present invention, a heat exchanger employs a duct housing assembly including two duct housings with platforms, respectively, and means for making the platforms coplanar with each other.

Specifically, the duct housings define theebetween a predetermined space for minimizing heat transmission theebetween.

Specifically, the duct housing assembly is resiliently supported within a casing in a spaced relationship to the casing.

DETAILED DESCRIPTION OF THE INVENTION

Figure 1:
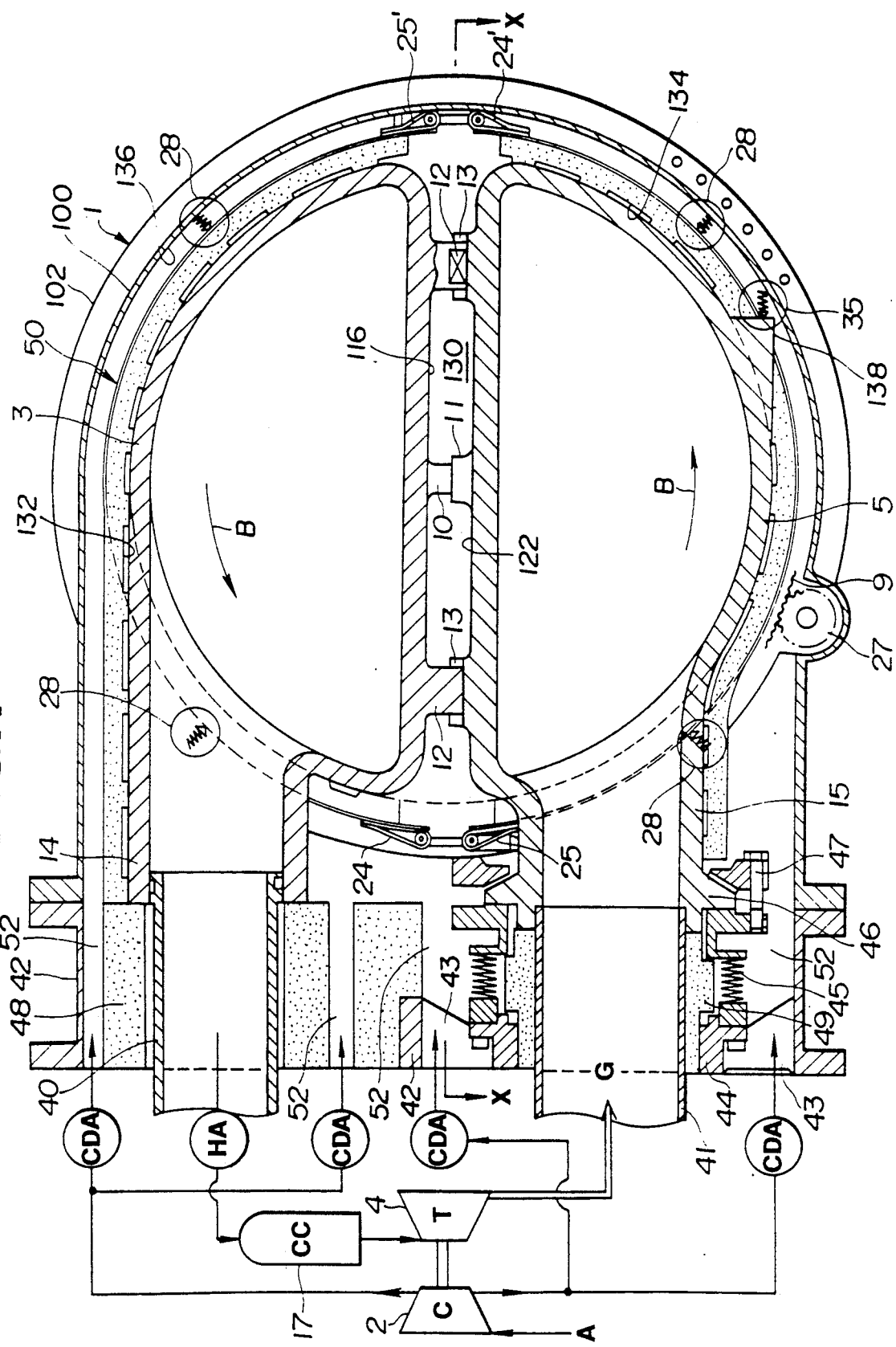
FIG. 1 is a diagram of a regenerative gas turbine with a heat exchanger sectioned through the line Y—Y of FIG. 2, showing semicircular platforms of a duct housing assembly resiliently supported within a casing.

Referring to the accompanying drawings, and particularly to FIG. 1, a gas turbine comprises a compressor 2 rotatable with a turbine 4 which receives a high temperature exhaust gas issued by a combustor 17. The high temperature exhaust gas is imparted to the turbine 4 to rotate the turbine 4 and the compressor 2. Ambient air admitted to the compressor 2 is compressed. A compressed discharge air from the compressor 2 (abbreviated as CDA) is supplied to a plurality of inlet passages 52 of a casing 1 of a heat exchanger, while a high temperature exhaust gas from the turbine 4 (abbreviated as G) is supplied to the heat exchanger. In the heat exchanger, a heat conversion is effected from the high temperature exhaust gas to the compressed dischage air. The air is heated and the high temperature air (abbreviated as HA) is supplied from the heat exchanger to the combustor 17.

Figure 2:
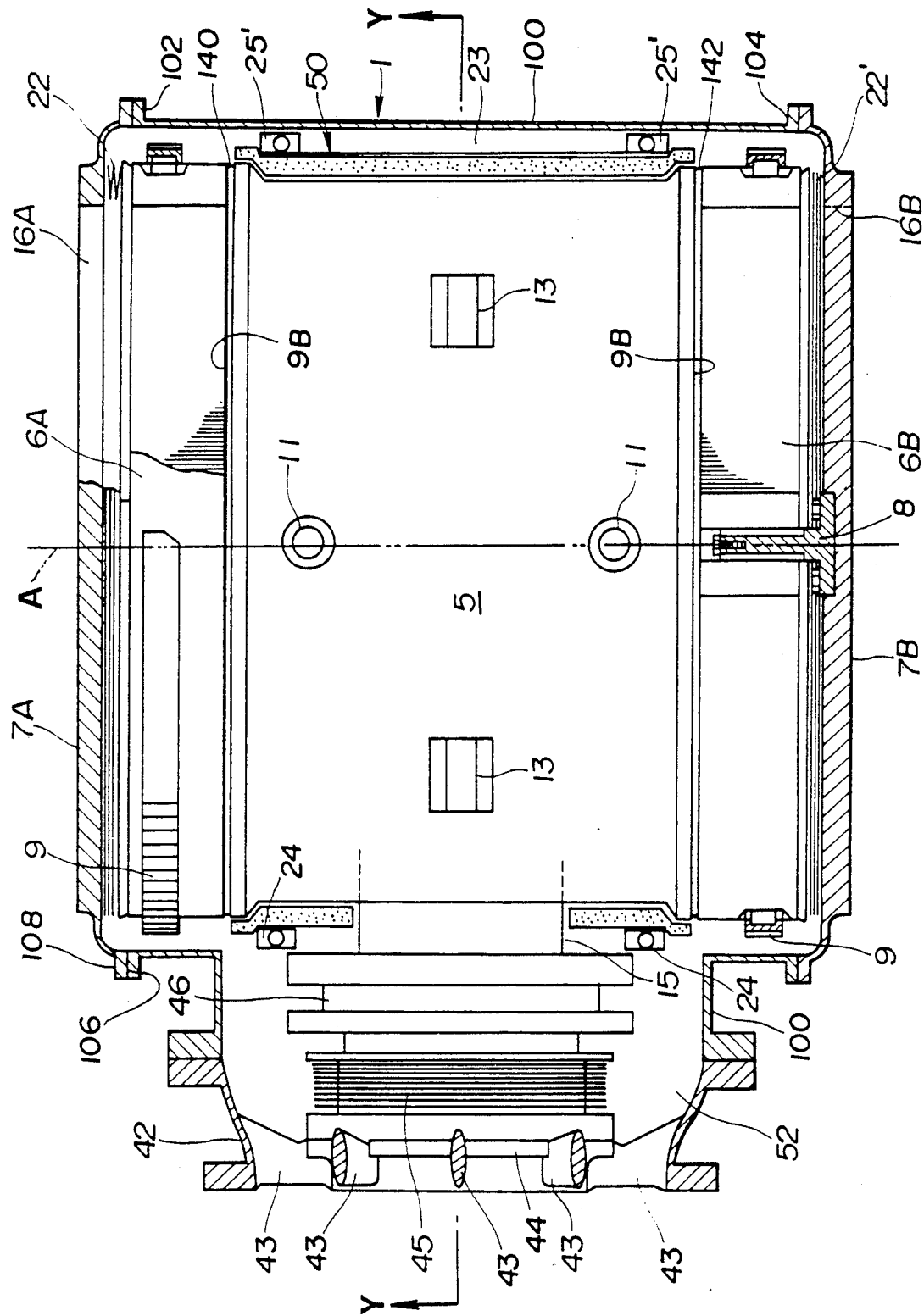
FIG. 2 is a section through the line X—X in FIG. 1.

Referring also to FIG. 2, the heat exchanger comprises a casing 1 which includes a circular tube portion 100 extending along an axial axis A. As best seen in FIG. 2, the circular tube portion 100 has axial ends opened and surrounded by circular end flanges 102 and 104. The casing 1 also includes two end closures 7A and 7B secured to the end flanges 102 and 104, respectively, to close the axial ends of the tube portion 100. The end closures 7A and 7B are formed with semicircular exhaust discharge openings 16A and 16B which are spaced, in the opposed manner, in a direction along the axial axis A. The tube portion 100 of the casing 1 is formed with a rectangular radial opening 106 surrounded by a rectangular flange 108. As shown in FIG. 2, the casing 1 also includes a cap adaptor 110 having one end securely connected to the rectangular flange 108, and a casing cap 42 securely connected to the cap adaptor 110.

Referring particularly to FIG. 2, two heat exchange core discs 6A and 6B are rotatably supported on splindles, only one being shown at 8, extending inwardly from the end closures 7A and 7B. In order to drive the heat exchanger core discs 6A and 6B, to rotate counterclockwise as viewed in and indicated by arrows B in FIG. 1, a rotary power is transmitted through a pinion 27 to ring gears 9 which are drivingly coupled with the heat exchanger core discs 6A and 6B, respectively. As shown in FIG. 1, the ring gears 9 are in mesh with the pinion 27. The heat exchange core discs 6A and 6B are spaced a distant from the end closures 7A and 7B. Between the heat exchange core disc 6A and the end closure 7A and between the heat exchange core disc 6B and the end closure 7B are two bellows 22 and 22' which have one ends fixedly connected to the adjacent end closures 7A and 7B at portions surrounding the semicircular exhaust discharge openings 16A and 16B. Each of the bellows 22 and 22' has an opposite end supporting a semicircular shoe in rubbing contact with the adjacent heat exchanger core disc 6A or 6B on the adjacent axial end face thereof. This sealing arrangement is effective to discharge high temperature exhaust gas having passed through the heat exchange core discs 6A and 6B to the exhaust discharge openings 16A and 16B. It will now be understood that there is a space defined between the end closure 7A and the opposite area of the axial end face of the heat exchange core disc 6A uncovered by the bellows 22, and there is another space between the end closure 7B and the opposite area of the axial end face of the heat exchange core disc 6B uncovered by the bellows 22'. These spaces are set aside for admitting the compressued discharge air to the heat exchange core discs 6A and 6B.

Figure 3:
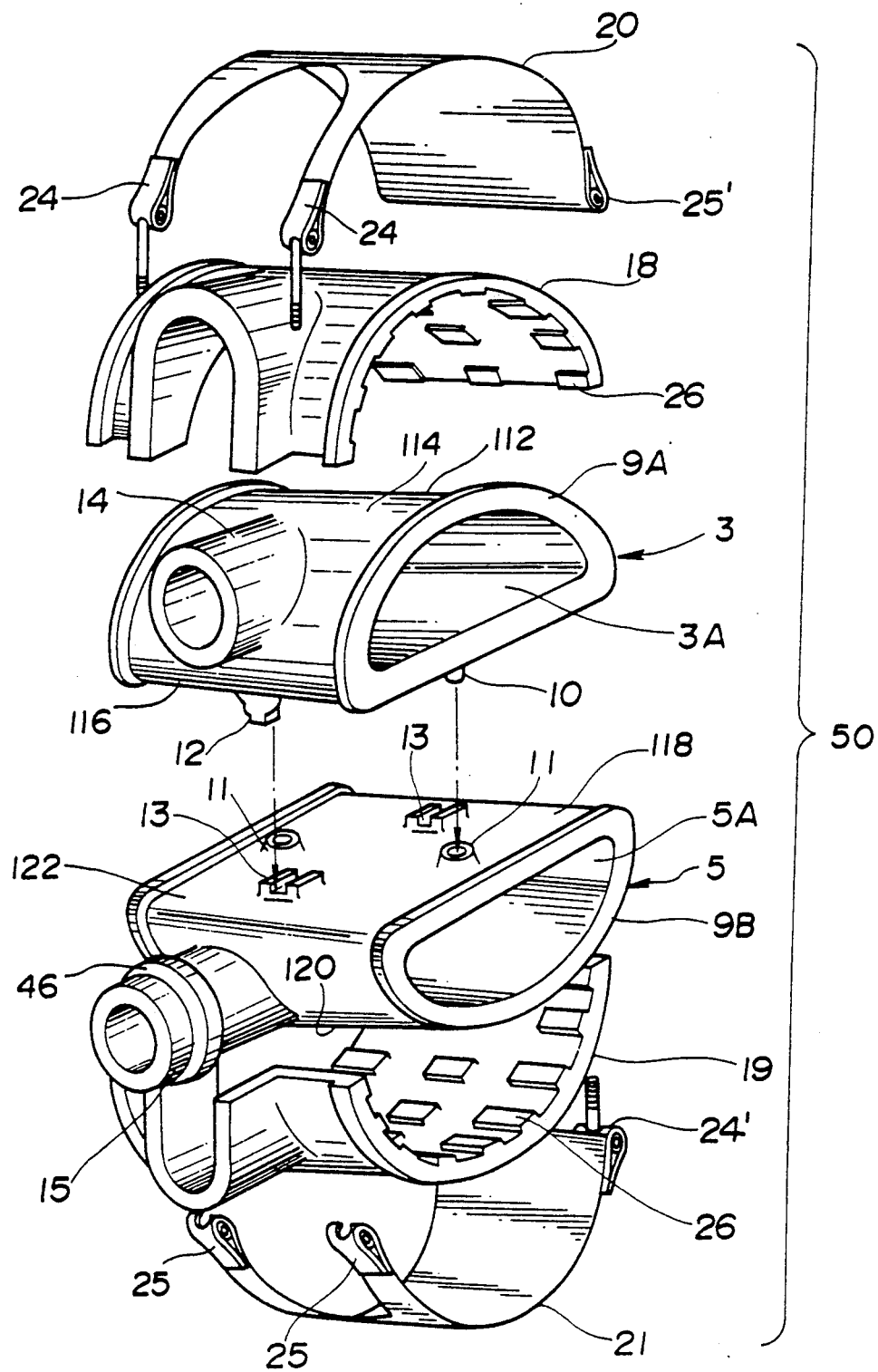
FIG. 3 is an exploded perspective view of the duct housing assembly.

Arranged, within the circular tube portion 100, between the heat exchange core discs 6A and 6B is a duct housing assembly 50. As best seen in FIG. 3, the duct housing assembly 50 includes an air duct housing 3 for receiving high temperature air having past through the heat exchange core discs 6A and 6B, a gas duct housing 5 for supplying high temperature exhaust gas to the heat exchange core discs 6A and 6B, split insulator covers 18 and 19, and bands 20 and 21.

Referring to FIG. 3, the duct housings 3 and 5 are generally T-shaped fluid connectors, respectively. Specifically, the air duct housing 3 includes a tubular main body 112, with a semicircular cross section, having a cylindrical surface 114 and a planar surface 116. Extending from the cylindrical surface 114 of the tubular main body 112 is a lateral air outlet tube 14. The tubular main body 112 is formed with a semicircular platform 9A surrounding a semicircular axial end opening 3A on each of its axial ends, only one being shown in FIG. 3. The gas duct housing 5 includes a tubular main body 118, with a semicircular cross section, having a cylindrical surface 120 and a planar surface 122. Extending from the cylindrical surface 120 of the tubular main body 118 is a lateral gas inlet tube 15. The tubular main body 118 has a semicircular platform 9B surrounding a semicircular axial end opening 5A on each of its axial ends, only one being shown in FIG. 3.

In assembly, the air duct housing 3 and gas duct housing 5 are arranged with their planar surfaces 116 and 122 in a face-to-face relationship. In order to keep a predetermined space 130 between these planar surfaces 116 and 122, and to make the platforms 9A coplanar with their adjacent platforms 9B, respectively, two bosses 10 on the air duct housing 3 are received in bores of two bored bosses 11 on the gas duct housing 5, and two key projections 12 on the air duct housing 3 are received in two key grooves 12. As best seen in FIG. 2, the two bored bosses 11 are arranged on the planar surface 122 of the gas duct housing 5 in a spaced relationship along the axial axis A. The bosses 10 are arranged on the planar surface 116 of the air duct housing 3 in a spaced relationship along the axial axis A in a similar manner. The key grooves 13 are arranged on the planar surface 122 of the gas duct housing 5 in a spaced relationship in a radial direction with respect to the axial axis A. The key projections 12 are arranged on the planar surface 116 of the air duct housing 3 in a spaced relationship in a radial direction with respect to the axial axis A in a similar manner. This predetermined space 130 defined between the opposed two planar surfaces 116 and 122 allows passage of compressed air to cool the bosses 10, bosses 11, key projections 12, and key grooves 13. Since this space 130 is ventilated by the compressed air, transmission of heat from the gas duct housing 5 to the air duct housing 3 is minimized.

As shown in FIG. 3, the insulator cover 18 has a number of inward projectins 26 arranged in rows in a spaced relationship, and the other insulator cover 19 has similar inward projections 26 arranged in rows in a spaced relationship. The insulator covers 18 and 19 are sized and shaped to cover the whole areas of the cylindrical surfaces 114 and 120 of the air and gas duct housings 3 and 5 and cover partially the air outlet pipe 14 and the gas inlet pipe 15.

The air and gas duct housings 3 and 5, insulator covers 18 and 19, and bands 20 and 21 are assembled and tightened by engaging couplers 24 with the mating couplers 25 and engaging couplers 24' with the mating couplers 25'. Each of the bands 20 and 21 is provided with the couplers 24 and 25 and 24' and 25', as seen in FIG. 3. As best seen in FIG. 1, the insulator covers 18 and 19 are out of contact with each other and spaced a distant to allow compressed air to enter the space 130 defined between the planar surfaces 116 and 122. The couplers 24 and 25 on the lefthand side viewing in FIG. 1 and the couplers 24' and 25' on the righthand side viewing in FIG. 1 are in contact with the compressed air. Owing to the provision of the inward projections 26 in abutting contact with the cylindrical surfaces 114 and 116 of the air and gas duct housings 3 and 5, there are a space 132 defined between the inner surface of the insulator cover 18 and the cylindrical surface 114 of the air duct housing 3 and a space 134 defined between the inner surface of the insulator cover 19 and the cylindrical surface 120 of the gas housing 5. These spaces 132 and 134 are open to receive compressed air.

Referring to FIG. 1, the housing assembly 50 is resiliently supported within the circular tube portion 100 of the casing 1 by means of a plurality of damper supports diagrammatically shown at 28 in such a manner that the housing assembly 50 is spaced from the inner wall of the tube portion 100 of the casing 1 to define between the housing assembly 50 and the inner wall of the tube portion 100 of the casing 1 an annular space 136 surrounding the housing assembly 50. The damper supports 28 are equi-angularly spaced along the inner wall of the circular tube portion 100 of the casing 1. In order to prevent the housing assembly 50 to rotate in the same direction as the heat exchange core discs 6A and 6B rotate, a stop 35 mounted to the cylindrical portion of the casing 1 is in abutting engagement with an integral shoulder 138 projecting from the cylindrical surface 120 of the gas duct housing 5. This shoulder 138 extends though the insulator cover 26 and the band 21.

Figure 4:
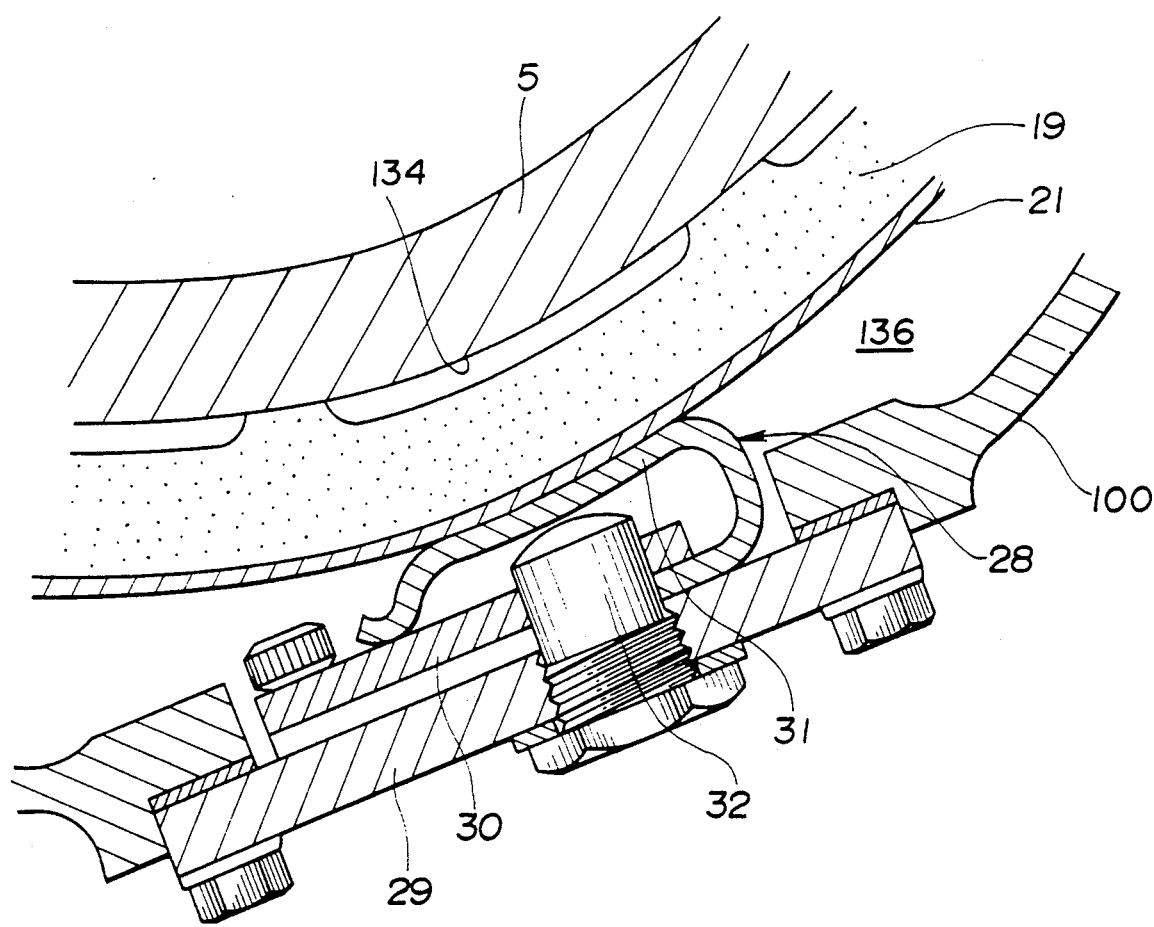
FIG. 4 is an enlarged fragmentary view of FIG. 1 showing a damper support.

As best seen in FIG. 4, each damper support 28 has a base plate 29 positioned to close in a fluid tight manner an opening formed through the tube portion 100 of the casing 1 and bolted to the tube portion 100. A plate spring 31 has one end fxiedly mounted to the base plate 29 by means of a retainer. The plate spring 31 has an opposite end portion curved to rest on the band 21 and compressed between the band 21 and the base plate 29. A force with which the damper support 28 biases the band 21 is adjustable by turning a set screw 32.

Figure 5A:
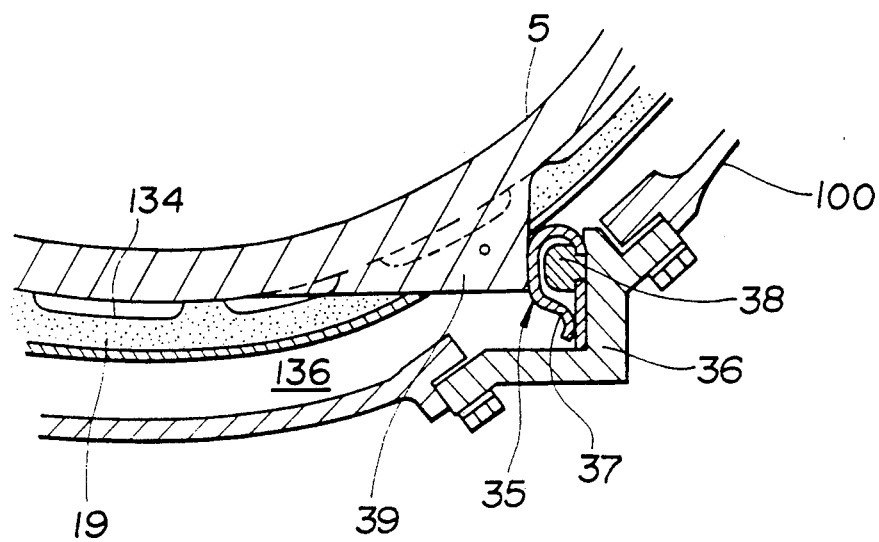
FIG. 5(A) is an enlarged fragmentary view of FIG. 1, showing a stop in abutting engagement with a shoulder of a gas duct housing.
Figure 5B:
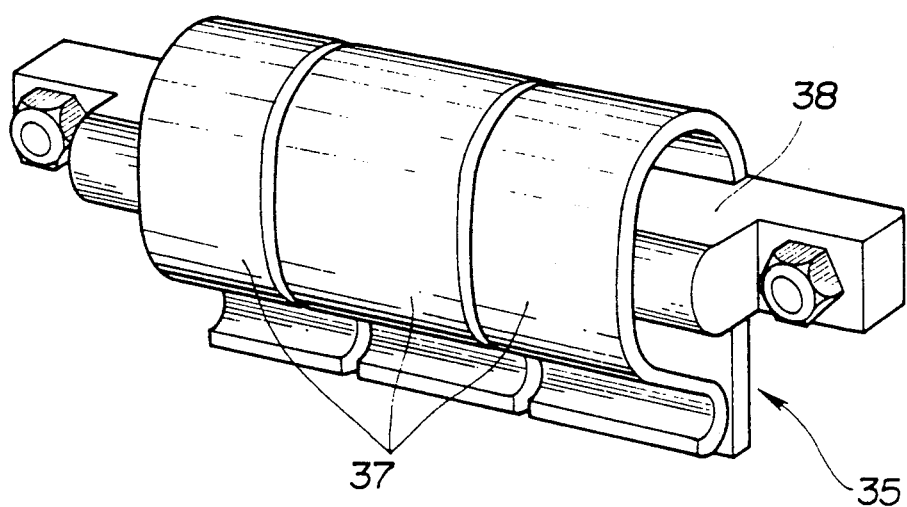
FIG. 5(B) is a perspective view of the stop shown in FIG. 5(A).

Referring to FIGS. 5(A) and 5(B), the stop 35 has a bracket 36 positioned to close in a fluid tight manner an opening formed through the tube portion 100 and bolted to the tube portion 100 of the casing 1. A plate spring 37 has one end fixedly retained to the bracket 36 by means of a set bar 38. The opposite end portion of the plate spring 37 is divided into three portions by means of two slits and in abutting engagement with the shoulder 39 integral with the gas duct housing 5. With this arrangement of the stop 35 in relation to the shoulder 39, the housing assembly 50 is prevented from tending to rotate following rotation of the heat exchange core discs 6A and 6B.

As shown in FIG. 1, a tubular insert 40 has one end inserted into the air outlet tube 14 of the air duct housing 3. The tubular insert 40 is covered by an insulator 48 which is mounted to the casing cap 42. Another tubular insert 41 has one end inserted into the gas inlet tube 15. This tubular insert 41 is covered by an insulator 49. Via the insulator 49, the tubular insert 41 is slidably received by a keep ring 44 supported by struts 43 which are fixed to the casing cap 42. Between the keep ring 44 and an annular flange 46 of the gas inlet tube 15 is arranged a bellows 45. The bellows 45 surrounds the insulator 49 on the tubular insert 41 and has one end securely connected by bolts to an annular extension of the keep ring 44 and an opposite end clamped to the annular flange 46 of the gas inlet tube 15 by means of a plurality of fasteners, only one being shown at 47. When the gas inlet tube 15 expands owing to temperature of the gas flowing through the gas duct housing 5, the insulator 49 and the tubular insert 41 move relative to the keep ring 44 since the keep ring 44 is slidably supported on the keep ring 44 and the bellows 45 is collapsible.

The plurality of spaces within the casing 1 including the spaces 130, 132, 134 and 136 communicates with the compressor 2 via the plurality of passages 52 formed through the casing cap 42 to receive compressed discharge air from the compressor 2.

Referring again to FIG. 2, a semicircular seal 140 is fixed to the semicircular platform 9B and in rubbing contact with the adjacent axial end face of the heat exchange core disc 6A, while a semicircular seal 142 is fixed to the semicircular platform 9B and in rubbing contact with the adjacent axial end face of the heat exchange core disc 6B. Although not illustrated, a semicircular seal is fixed to the semicircular platform 9A and in rubbing contact with the adjacent axial end face of the heat exchange core disc 6A, while a semicircular seal is fixed to the semicircular platform 9A and in rubbing contact with the adjacent axial end face of the heat exchange core disc 6B.

In operation, the heat exchange core discs 6A and 6B rotate owing to a rotary motion transmitted to the ring gears 9 from the pinion 27 in the direction as indicated by the arrows B in FIG. 1. The housing assembly 50 is held stationary owing to the stop 35. High temperature exhaust gas G from the turbine 4 is supplied via the gas inlet tube 15 into the gas duct housing 5 and splits into two flows, one flow directed toward the heat exchange core disc 6A, the other flow toward the heat exchange core disc 6B. The flow of high temperature exhaust gas passes through a portion of the heat exchange core disc 6A toward the exhaust discharge opening 16A, while the other flow of high temperature exhaust gas passes through a portion of the heat exchange core disc 6B toward the exhaust discharge opening 16B. In this manner, the rotary heat exchange core discs 6A and 6B are heated. Compressed discharge air with a low temperature is supplied to the plurality of air inlet passages 52 within the cap casing 42, flowing into the spaces 130 and 136, flowing radially inwardly into the space defined between the end closure 7A and that area on the adjacent axial end face of the heat exchange core disc 6A which is radially outside of the adjacent bellows 22 and into the space defined between the end closure 7B and that area on the adjacent axial end face of the heat exchange core disc 6B which is radially outside of the adjacent bellows 22'. The air within these spaces flow inwardly past the heat exchange core discs 6A and 6B into the air duct housing 3. The air is heated during the passage through the heat exchange core disc 6A or 6B and thus increases in temperature. High temperature air having past through the heat exchange core discs 6A and 6B is supplied via the outlet tube 14 to the combustor 17.

Radial flows between the adjacent axial opened ends 3A and 5A of the air and duct housings 3 and 5 are prevented owing to the semicircular seals fixed to the coplanar platforms 9A and 9B and in rubbing contact with the adjacent axial end face of the heat exchange core disc 6A or 6B.

From the preceding description, it will now be appreciated that the air housing 3 and the duct housing 5 are separated and assembled with the space 130 kept between their planar surfaces 116 and 122 and the platforms 9A are kept coplanar with the adjacent platforms 9B, respectively, owing to the bosses 10 received in the bore bosses 11 and the key projections 12 received in the key grooves. Since the heat transfer from the gas duct housing 5 to the air duct housing 3 is minimized, the platforms 9A and 9B are less subject to deformation owing to thermal stress and thus remain in the designed surface condition. Thus, a gas leakage between the platforms 9A and 9B and the adjacent axial end faces of the heat exchange core discs 6A and 6B is prevented.

It will also be appreciated that the air and gas duct housings 3 and 5 are covered by the insulator covers 18 and 19, and the spaces 132 and 134 are defined between the duct housings 3 and 5 and the insulator covers 18 and 19, respectively. The provision of the insulator covers 18 and 19 and the spaces 132 and 134 is effective for even distruibution of temperature through each of the duct housings 3 and 5. Thus, a local heat spot does not exit and no substantial thermal stress takes place on each of the duct housings 3 and 5.

It will be further appreciated that the ducts are formed by two separate duct housings 3 and 5 which are not bulky in size, resulting in a good yield in manufacture.

It will be further appreciated that the duct housings 3 and 5 are preassembled and this preassembled unit is inserted into the tube portion 100 of the casing 1, making the assembly easy. Besides, the damper supports 28 and stop 35 resiliently support the housing assembly 50 within the casing 1 so that the housing assembly 50 is protected from vibration and impact applied to the casing 1 from the outside.

It will be further appreciated that although the casing 1 is made of a material having a thermal expansion effeciency different from a material which the air and gas duct housings 3 and 5 are made of, a heat transfer between the casing 1 and the duct housings 3 and 5 are minimized by the provision of annular space 136 defined between the housing assembly 50 and the tube portion 100 of the casing 1, and the bellows 45 interconnects the keep ring 44 fixed to the casing 1 and the gas inlet tube 15 of the gas duct housing 5 for absorbing a difference in thermal expansion between the casing 1 and the gas duct housing 5. Owing to this arrangement, a gas leakage from the high temperature gas flow toward the compressed air flow surrounding this gas flow is prevented or at leat minimized.

It will be also appreciated that compressed discharge air from the compressor 2 is supplied to the passages 45, and spaces 130 and 136, thus cooling down the bellows 45, fasteners 47, pinion 27, ring gears 9, bands 20 and 21, damper supports 28, stop 35, and couplers 24, 25, 24' and 25' 24', and 25'.

Although, in the previously described embodiment, two heat exchange core discs are disposed to interpose therebetween the housing assembly 50, a heat exchange core disc may be disposed on one axial end of a housing assembly. In this case, the opposite axial end of the housing assembly is closed.

What is claimed is:

1. A heat exchanger, comprising:
   a casing;
   a heat exchange core disc having an axial end face; and
   a duct housing assembly including a first duct housing with a first platform, a second duct housing with a second platform, said first duct housing being separate and distinct from said second duct housing, and means for making said first and second platforms coplanar with each other;
   said heat exchange core disc being rotatable within said casing, said duct housing assembly being mounted within said casing with said first and second platforms cooperating with said axial end face of said heat exchange core disc.

2. A heat exchanger as claimed in claim 1, wherein said duct housing assembly includes means for defining a predetermined space between said first and second duct housings.

3. A heat exchanger as claimed in claim 2, wherein said casing has means for resiliently supporting said duct housing assembly in a spaced relationship to said casing.

4. A heat exchanger as claimed in claim 3, wherein said second duct housing includes an inlet tube mounted to said casing for limited movement relative thereto.

5. A heat exchanger as claimed in claim 4, wherein said casing has a bellows having one end fixed thereto, and said bellows is coupled to said inlet tube of said second duct housing with an opposite end of said bellows fixed to said inlet tube.

6. A heat exchanger as claimed in claim 5, wherein said housing assembly includes band means for uniting said first and second duct housings 7. A heat exchanger as claimed in claim 6, wherein said duct housing assembly includes insulator means between said band means and said first and second duct housings.

8. A heat exchanger as claimed in claim 7, wherein said band means includes a first band, a second band, and coupler means for joining said first and second bands with each other.

9. A heat exchanger as claimed in claim 8, wherein said insulator means includes a first insulator cover disposed between said first duct housing and said first band, and a second insulator cover disposed between said second duct housing and said second band.

10. A heat exchanger as claimed in claim 9, wherein said first insulator cover includes means for defining a space between said first duct housing and said first insulator cover, and said second insulator cover includes means for defining a space between said second duct housing and said second insulator cover.

11. In a heat exchanger for a gas turbine including a compressor, a gas turbine, and a combustor,
    a casing;
    a heat exchange core disc having an axial end face and an opposite axial end face; and
    a duct housing assembly including a first duct housing with a first platform, a second duct housing with a second platform, said first duct housing being separate and distinct from said second duct housing, and means for making said first and second platforms coplanar with each other;
    said heat exchange core disc being rotatable within said casing, said duct housing assembly being mounted within said casing with said first and second platforms cooperating with said axial end face of said heat exchange core disc,
    said duct housing assembly cooperating with said casing to define therebetween space means for admitting a compressed discharge air from the compressor into said heat exchange core disc from said opposite axial end face thereof,
    said first duct housing having an opening surrounded by said first platform for receiving said compressed discharge air having past through said heat exchange core disc and an outlet tube for supplying said compressed discharge air having past through said heat exchange core disc to the combustor,
    said second duct housing having an inlet tube for receiving an exhaust gas from the turbine and an opening surrounded by said second platform for admitting said exhaust gas into said heat exchange core disc from said axial end face thereof.

* * * * *